United States Patent [19]

Carey

[11] 4,211,802

[45] Jul. 8, 1980

[54] METHOD OF MAKING A COOKING VESSEL RELEASE MATERIAL

[76] Inventor: Wayne C. Carey, 71 Salt St., Rittman, Ohio 44270

[21] Appl. No.: 971,725

[22] Filed: Dec. 21, 1978

Related U.S. Application Data

[63] Continuation-in-part of Ser. No. 462,787, Apr. 22, 1974, abandoned, which is a continuation-in-part of Ser. No. 341,400, Mar. 15, 1973, Pat. No. 3,821,007.

[51] Int. Cl.$^2$ .............................................. A23D 5/00
[52] U.S. Cl. ................................... 426/609; 426/653; 426/662
[58] Field of Search ...................... 426/609, 653, 662

[56] References Cited

U.S. PATENT DOCUMENTS

| | | | |
|---|---|---|---|
| 2,210,043 | 8/1940 | Scherr | 426/609 |
| 2,793,123 | 5/1957 | Haas | 426/609 |
| 2,963,372 | 12/1960 | Brody et al. | 426/609 |

*Primary Examiner*—Robert A. Yoncoskie
*Attorney, Agent, or Firm*—Oldham, Oldham, Hudak & Weber

[57] ABSTRACT

A composition and method for making a cooking vessel release paste containing 50 parts by weight of a clear flour, from 23–30 parts by weight of soybean flour, from 118–140 parts by weight of a liquid hydrogenated vegetable oil, from 95–110 parts by weight of a vegetable shortening and from 5–10 parts by weight of lecithin.

8 Claims, No Drawings

METHOD OF MAKING A COOKING VESSEL RELEASE MATERIAL

CROSS REFERENCE

This application is a continuation-in-part of my prior application bearing U.S. Ser. No. 462,787, filed Apr. 22, 1974, now abandoned, which is a continuation-in-part of my application bearing Ser. No. 341,400, filed Mar. 15, 1973, now U.S. Pat No. 3,821,007, which issued on June 28, 1974.

BACKGROUND OF THE INVENTION

Heretofore, it always has been a problem to release various materials from cooking utensils after a cooking action therein. Thus, people may rub butter or other greases onto a cooking container prior to placing the material to be cooked therein. It is also desirable to use release materials when forming other articles, such as molded gellatin products, and other foodstuffs. Even after the cooking operation, it still is very difficult, in many instances, to release the cooked article from the cooking vessel. Furthermore, the ultimate cleaning of the cooking containers or vessels used is difficult in many instances.

While special release coated vessels are available, they are generally expensive. Moreover, other vessels require individual coatings applied thereto to prevent the cooked article from sticking in the cooking utensil, but which coatings, in fact, do not prevent or abate sticking.

U.S. Pat. No. 2,963,372, to Brody et al, relates essentially to oils or pumpable mixtures which may contain small amounts of lecithin therein. Although the specification does state that solids, such as wheat flour, may be utilized, the overall mixture nevertheless is indicated as being a fluid and is pumpable. Hence, it is not a paste as is applicant's invention and, further, lacks any suggestion of utilizing a "Clear" type flour.

U.S. Pat. No. 2,793,123, to Haas, relates to a bakery coating containing from 15–85% of an oil or fat, 85–15% of a disbursing coating, such as flour, starch, sugar, milk solids and the like, and ¼%–5% of an inverter, such as citric acid, to impart a glossy sheen or glaze to rolls, buns, biscuits and the like. This patent does not suggest applicant's invention in that it does not suggest the use of lecithin, or the use of a "Clear" type flour. Moreover, it also relates to the use of an inverter which applicant does not utilize.

U.S. Pat. No. 2,210,043, to Scherr, relates to a blend of an oil and/or fat with a starch. Thus, this invention is distinguished in the fact that it does not utilize a "Clear" flour, a soybean flour, or lecithin. Moreover, this patent states that it is critical that starch be utilized in order to formulate a suitable composition for greasing baking pans.

SUMMARY OF THE INVENTION

The general object of the present invention is to provide a composite and method of making a homogeneous paste for use as a pan release coating. It is a further object of the present invention to provide a pan release paste, as above, wherein hydrogenated oil is mixed with "Clear" flour and soybean flour, and lecithin to form a homogeneous mixture capable of being dispensed from an aerosol container, or brushed on the surface of the container.

Another object of the invention is to mix a pan release paste by high speed solid blending action or by a temperature controlled extrusion action to obtain a homogeneous paste or semisolid material for use as a cooking utensil release material.

Another object of the invention is to provide a storable and sprayable release paste which will readily coat, adhere and form a film on an article, which film is non-injurious to either foodstuffs and/or humans and which film can be applied to cooking vessels, utensils, and the like.

The foregoing and other objects and advantages of the invention will be made more apparent as the specification proceeds.

Generally, a cooking vessel release paste, consisting essentially of 50 parts by weight of clear flour, 23–30 parts by weight of a soybean flour, from 95–110 parts by weight of a hydrogenated vegetable shortening, from 118–140 parts by weight of a STA-Blend vegetable oil, and from 5–10 parts of lecithin, said compounds existing as a paste.

Additionally, a process for making a cooking vessel release paste consisting essentially of the steps of adding to a container 50 parts by weight of clear flour, 23–30 parts by weight of a soybean flour, from 95–110 parts by weight of a hydrogenated vegetable shortening, from 118–140 parts by weight of a STA-Blend soybean oil, and from 5–10 parts of lecithin, heating and mixing said ingredients to a temperature of from about 70° F. to about 130° F. and placing said mixed ingredients into a container so that a paste is formed.

PREFERRED EMBODIMENTS

This invention relates to the formation of a pan release paste which will adhere to the side of cooking utensils and additionally can be placed in any conventional aerosol with a compressed propellant gas, and dispensed as a spray mist onto a desired article.

The pan release paste has the following formulation:

| INGREDIENT | RANGE | PREFERRED AMOUNT |
| --- | --- | --- |
| CLEAR TYPE FLOUR (commercial grade) | 50 parts | 50 parts |
| SOYBEAN FLOUR (commercial grade) | 23–30 parts | 25 parts |
| HYDROGENATED VEGETABLE SHORTENING (high grade) | 95–110 parts | 100 parts |
| STA-BLEND VEGETABLE OIL (specially processed) | 118–140 parts | 125 parts |
| LECITHIN | 5–10 parts | 8 parts |

The non-soybean flour is a grade of flour known in the industry as a "Clear" flour and less commonly known as a soft wheat flour. This flour, although made from wheat, generally from the first milling of the wheat and is dark in color, is never used in making wheat bread, even the commonly so-called "white bread". Rather, it is used exclusively for making rye bread as a filler or carrier. In fact, according to those skilled in the art, "Clear" flour and being solely used for making rye bread is not encompassed by the term "wheat flour". In other words, the term "Clear" flour is not considered by bakers, wholesale flour companies, and millers as being the wheat flour which would be utilized in making various breads, pastries, cakes and the like in which wheat flour is utilized.

The soybean flour is made from soybeans and has some soy oil in it. Sometimes it is either classified as either high fat or low fat soybean flour but, normally, is simply denominated as soybean flour although after high fat is utilized.

The vegetable shortening is made from soybean oil that is hydrogenated until it becomes a solid. A specific example being a hydrogenated vegetable shortening (high grade), as made by Capital City of Columbus, Ohio.

The STA-Blend vegetable oil is simply a soybean oil which has been specially processed to render it STA, that is will not degrade or become rancid upon standing for long periods of time as a year or two.

In making the composition of the invention, it has been found that the "Clear" flour, soybean flour, hydrogenated soybean shortening, liquid soybean oil and lecithin can all be placed into a container and blended, as by commercial high-speed blenders using mixing blades or knives to form a substantially homogeneous semi-solid or paste wherein the original solid ingredients are in a semi-suspension form. Conventional blender apparatus, such as an Oakes mixer or a Voltator type mixer, can be used. High speed blending action, for the purposes of this invention, is considered to be obtained when the blending knives or blades are driven at a speed of from about 1,500 to about 4,000 rpm by any known type of a drive or speed control means. Or, the materials forming the composition of the invention can be placed in any suitable type of a pressure extrusion device where the ingredients are blended in the extruder and further extruded through a small mesh screen to insure complete blending at ambient temperatures. Normally, in both the blender and in the extrusion device, the temperature of the apparatus would be controlled. However, it is preferred in the practice of the present invention to maintain such a temperature somewhere in the vicinity of room temperature as good mixing conditions can be obtained without melting the shortening material used. A suitable ambient temperature ranges between about 70° F. to about 135° F.

When the product obtained is at a temperature of from about 80° or 85° to about 135°, it can be poured from the mixing or blending container or from the extrusion device directly into a carrier container therefor. Upon cooling to about 70° F., the composition may become slightly more viscous in the containers and forms a semi-solid or paste composition. Such paste composition can be brushed or rubbed onto the surface of a cooking vessel and it will form a very desirable and satisfactory release type coating on the vessel to permit and facilitate ready separation of the cooked material or product from the cooking vessel without any sticking therebetween. Such paste in being a semi-solid is not pumpable.

If desired, the composition of the invention can also be spray dispensed by being placed in a suitable aerosol container as described hereinafter.

The extrusion device used for blending the ingredients of the composition together can be of any conventional type either a screw type or a ram-pusher type of extruder means.

The semi-liquid paste obtained can be stored indefinitely at room temperatures without any damage or deterioration thereto.

By the controlled blending action provided by the invention, the vegetable shortening is not liquified at any time but, yet, a homogeneous end product is obtained.

As noted in the above formulation, the quantities of vegetable oil, shortening, and lecithin can be varied. Preferably, the amount of flour used stays constant whereby the variation in oil, shortening and lecithin will not alter the ultimate desirable characteristics of the pan release composition from a pastelike consistency.

Specifically, in practice of the invention, the shortening used was Capital City Products Company, Columbus, Ohio, BBS Shortening, which has the following characteristics:

| | |
|---|---|
| Capillary Melting Point | 117° F. |
| Wiley Melting Point | 114.5° F. |
| Free Fatty Acid | 0.03% |
| Color | .4 yellow-0.4 red |
| Flavor | Good |
| Penetration | 136 |
| A.O.M. Stability | Over 100 hours |
| SFI: 50° F. | 30.1 |
| 70° F. | 20.2 |
| 80° F. | 18.8 |
| 92° F. | 13.9 |
| 101° F. | 9.7 |

The Capital City Products Co. vegetable oil has the following characteristics:

| | |
|---|---|
| Color | 10.0 yellow-1.0 red |
| Free Fatty Acid | 0.03% |
| Flavor | Good |
| Peroxide Value | 1.0 |
| A.O.M. | 20 hours |
| Cold Test | 15 hours |

The homogeneous mixture, which has low viscosity, can be placed in any conventional propellant container of the aerosol type if desired and with a conventional propellant gas being present in the container under pressure for aerosol dispensing action at a later time.

While any conventional propellant can be used, a material such as trichloro-mono-fluoro metracane is one propellant that has been used very satisfactorily. Normally, any halogenated hydrocarbon of the gas propellant type can be used in practice of the invention. U.S. Pat. No. 2,849,323 discloses other conventional propellants which can be utilized and is hereby fully incorporated by reference.

When placing the release material in a container for propelling action, preferably about 15 to 20 percent of the light paste release material is present in the can which contains approximately 85 to 80 percent by weight of propellant. However, these amounts can vary as desired. The mixture will spray as a thin mist that adheres and covers or sets up relatively quick to provide a continuous coating on the article coated with the spray.

The release material permits convenient and easy release of products cooked or baked, etc., such as cakes, cookies, pizza, etc., from containers and further permits easy cleaning of the container. The material of the invention can even be sprayed or be brushed onto a hot skillet or cooking member and it still acts to provide a release coating thereon.

While embodiments of the invention have been disclosed herein, it will be appreciated that modification of the particular embodiment of the invention may be resorted to without departing from the scope of the invention.

What is claimed is:

1. A cooking vessel release paste composition, consisting essentially of:
   50 parts by weight of clear flour,
   23–30 parts by weight of a soybean flour,
   from 95–110 parts by weight of a hydrogenated soybean oil having a capillary melting point of approximately 117° F.,
   from 118–140 parts by weight of a soybean oil stabilized against oxidation, and
   from 5–10 parts of lecithin.

2. A cooking vessel release paste composition, according to claim 1, wherein said soybean oil stabilized against oxidation has a peroxide value of about 1.0, and an A.O.M. value of 20 hours.

3. A cooking vessel release paste composition, according to claim 2, wherein said hydrogenated soybean oil has a penetration of 136 and SFI values at 50° F. of 30.1, at 70° F. of 20.2, at 80° F. of 18.8, at 92° F. of 13.9, and at 101° F. of 9.7, and wherein said soybean oil stabilized against oxidation has a cold test value of 15 hours.

4. A cooking vessel release paste composition, according to claim 3, wherein the amount of said soybean flour is 25 parts by weight, wherein the amount of said soybean oil stabilized against oxidation is 125 parts by weight, wherein the amount of said hydrogenated soybean oil is 100 parts by weight, and wherein the amount of said lecithin is 8 parts by weight.

5. A process for making a cooking vessel release paste consisting essentially of the steps of:
   adding to a blending container 50 parts by weight of clear flour,
   23–30 parts by weight of a soybean flour,
   from 95–110 parts by weight of a hydrogenated soybean oil having a capillary melting point of approximately 117° F.,
   from 118–140 parts by weight of a soybean oil stabilized against oxidation, and
   from 5–10 parts of lecithin,
   heating and mixing said ingredients in said blending container to a temperature of from about 70° F. to about 130° F.,
   and placing said mixed ingredients into a carrier container.

6. A process according to claim 5, wherein said soybean oil stabilized against oxidation has a peroxide value of about 1.0, and an A.O.M. value of 20 hours.

7. A process according to claim 6, wherein said hydrogenated soybean oil has a penetration of 136 and SFI values of 50° F. of 30.1, at 70° F. of 20.2, at 80° F. of 18.8, at 92° F. of 13.9, and at 101° F. of 9.7, and wherein said soybean oil stabilized against oxidation has a cold test value of 15 hours.

8. A process according to claim 7, wherein the amount of said soybean flour is 25 parts by weight, wherein the amount of said soybean oil stabilized against oxidation is 125 parts by weight, wherein the amount of said hydrogenated soybean oil is 100 parts by weight, and wherein the amount of said lecithin is 8 parts by weight.

* * * * *